United States Patent Office 3,395,988
Patented Aug. 6, 1968

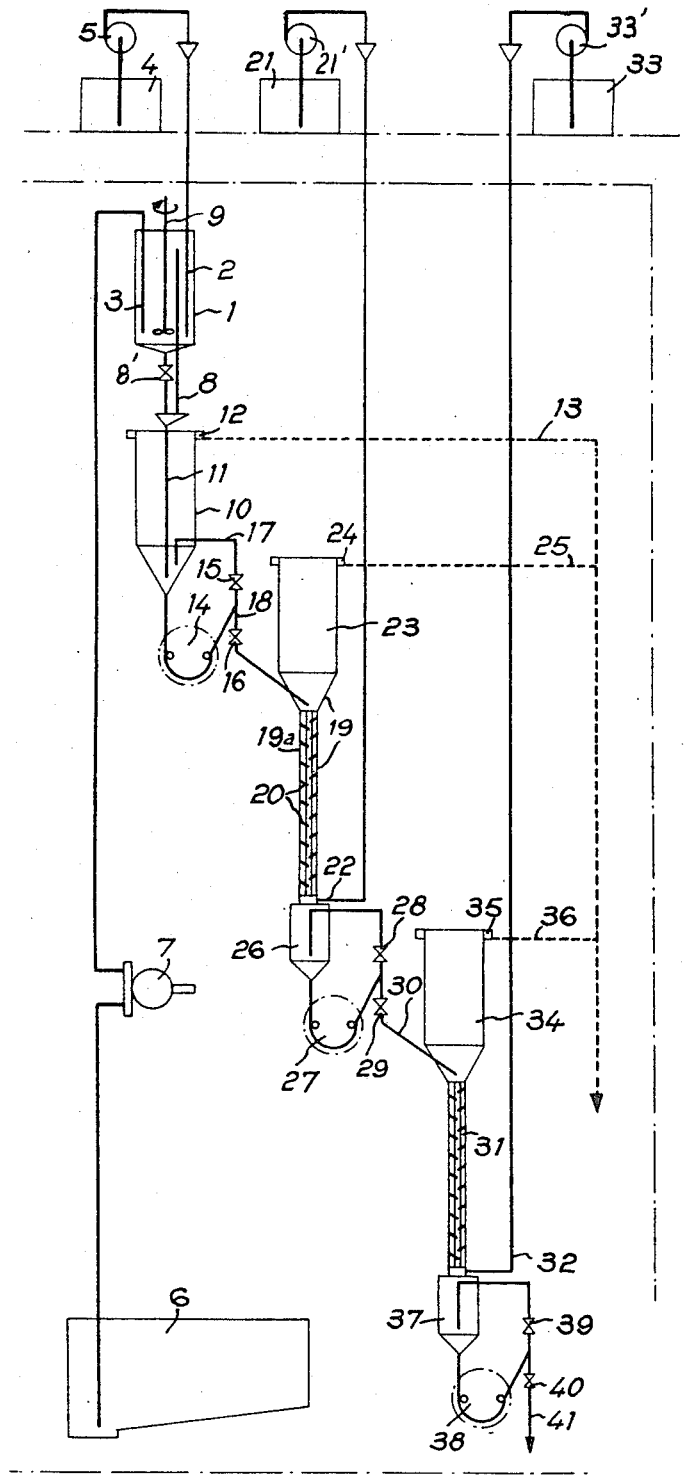

3,395,988
APPARATUS FOR THE CONTINUOUS PRECIPITATION OF PLUTONIUM IN THE FORM OF OXALATE
Pierre Auchapt and Georges Bouzou, Bagnols-sur-Ceze, France, assignors to Commissariat à l'Energie Atomique, Paris, France
Filed Sept. 14, 1964, Ser. No. 396,001
Claims priority, application France, Sept. 19, 1963, 947,959
3 Claims. (Cl. 23—260)

The present invention relates to a method of continuous precipitation of plutonium in the form of oxalate as well as an apparatus for the practical application of said method.

Plutonium oxalate is usually prepared by precipitation from a solution of plutonium nitrate and oxalic acid; this operation is usually carried out at high temperature and calls for a subsequent purification of the product which is thus prepared.

The object of the present invention is to make it possible to prepare plutonium oxalate in a continuous manner and also to purify this latter in a continuous manner.

According to the method of the invention, the precipitation of plutonium in the form of oxalate is carried out starting from a solution of plutonium nitrate and oxalic acid by mixing these two reagents at room temperature, the oxalate which is obtained being then decanted and the precipitate which is thus separated is washed in countercurrent flow with a solution of nitric acid and oxalic acid; the precipitate which is thus washed is collected in a settler and the precipitate which has previously been washed is finally subjected to a countercurrent washing with water.

The invention is also concerned with the equipment which is necessary for the practical application of the method as hereinabove defined.

The aforesaid equipment is characterized in that it comprises a mixer which is preferably made of glass and which is intended for the purpose of carrying out the precipitation of plutonium oxalate, said mixer being fitted with a stirrer for the purpose of homogenizing the suspension of oxalate which is obtained, a cylindro-conical settler which is also made of glass and which serves to separate the plutonium oxalate from the suspension which has been transferred from the mixer, a transfer pump fitted with air valves, a first acid washing column which comprises the washing column proper, a settling vessel at the top of the column and a vessel for receiving the washed precipitate at the bottom of the column, a second transfer pump and a further washing column for the purpose of washing with water.

The apparatus for the practical application of the method according to the invention permits the possibility of processing in continuous operation a substantial volume of solution while at the same time complying with geometric conditions so as to prevent any likelihood of attaining conditions of criticality.

In accordance with one characteristic feature of the equipment according to the invention, the devices for transferring the precipitate from the first settler towards the acid washing column and for transferring the precipitate from the vessel in which it is received from the acid washing column towards the column for washing with water operate in a continuous recycling process; the precipitate is thus circulated in a closed loop and is delivered into the washing column located downstream only during a predetermined period of the cycle. In this manner, any packing of plutonium oxalate into either one or the other of these fluid-circuits is accordingly prevented.

According to the invention, a continuous process is thus carried into effect by means of an installation which has a reliable geometry from the point of view of critical conditions, irrespective of the quantity of plutonium oxalate which is present within the apparatus.

The first step in said process consists in the precipitation of plutonium oxalate in known manner starting from a solution of plutonium nitrate and oxalic acid. The next step consists in carrying out the acid washing of the plutonium oxalate in a countercurrent flow arrangement and in advantageously making use of a mixture of 2 N nitric acid and M/100 oxalic acid. The washing process just referred-to is intended to eliminate the impurities which are contained in the solution of plutonium nitrate such as in particular, iron, uranium and a number of different radiation emitters such as, for example, zirconium and niobium.

A further step consists in washing the plutonium oxalate with water in countercurrent flow, the object thereby achieved being to eliminate the nitric acid ions which would otherwise be liable to give rise to corrosion processes at the time of subsequent fluorination of the oxalate.

Finally, the oxalate which is obtained in accordance with the invention contains approximately 50 to 70% by weight of water and can be dried, for example, in a furnace of the endless screw type.

One example of embodiment of an apparatus in accordance with the invention is given below by way of illustration, without any limitation being implied.

A mixer 1 is made up of a cylindrical tube of glass having an internal diameter of 150 millimeters and a height of 300 millimeters with a useful volume of 5,270 cm.$^3$. Two tubes 2 and 3 of polyethylene having an internal diameter of 6 millimeters extend to a depth of 20 millimeters from the bottom of the mixer 1. Said tubes 2 and 3 are located in diametrically opposite relation and permit the introduction of the reagents at the bottom of the apparatus. The tube 2 is connected to a tank 4 which contains the oxalic acid, a pump 5 being mounted near the tank for the purpose of proportioning the oxalic acid. The tube 3 is connected to a tank 6 which contains the nitric acid solution of plutonium, a proportioning pump 7 being provided for the circulation of this latter.

Another tube 8 of polyethylene having an internal diameter of 10 millimeters is located against the internal wall of the apparatus and serves as a stationary overflow. The upper extremity of said tube is placed at a distance of 300 millimeters from the base of the mixer 1. A stirrer 9, which is provided with curved blades and designed to rotate at approximately 190 revolutions per minute, is mounted inside the mixer 1. Said stirrer permits the admixture of reagents and the homogenization of the plutonium oxalate suspension.

After admixture of the reagents, the said suspension flows out through the tube 8 which performs the function of an overflow towards a settler 10 which is located beneath the mixer 1 and in the line of extension of this latter.

The mixer 1 is provided at its lower extremity with an outlet pipe which is fitted with a valve 8' for the purpose of draining-off the mixer as and when required.

The aforesaid settler 10 has a cylindro-conical shape and is fabricated of glass. The internal diameter thereof is 150 millimeters, the depth of the cylindrical portion thereof is 300 millimeters, the angle at the vertex of the cone is 60° and its useful volume is approximately 5,900 cm.$^3$. A glass tube 11 having a diameter of 10 millimeters extends to within 6 centimeters of the vertex of the conical portion of the settler 10 and permits the introduction of the plutonium oxalate suspension at the base of the settler. The precipitate accumulates within the summit of the cone and the decanted mother-liquors are collected at the top portion of the settler 10 by means of a peripheral collector 12 and are directed via the piping system 13 towards a recovery facility.

A transfer device 14 is provided at the bottom portion of the settler 10 and consists of sludge pumps of the type known as "Delasco" or "Waab." Said pumps rotate at a speed of two or three revolutions per minute and are adapted to cooperate with air valves 15 and 16 according to the principle of operation which will be explained hereunder.

The valves referred to, which can consist: either of a hose which is formed, for example, of a material known under the commercial designation of "Rodorail" and is inserted in a cylindrical casing of stainless steel (by injection of compressed air, the flexible pipe is flattened and thus prevents any circulation); or of a hose which is formed, for example, of a material sold in commerce under the name of "Rodorail" or "Neoprene" and which is flattened over a length of approximately 15 millimeters by means of a compressed-air jack, permit the possibility of carrying out the continuous recycling of precipitate within a circulation system in the form of a closed loop.

In fact, the transfer pump 14 sucks the precipitate from the bottom of the settler 10 and delivers it into the pipe 17. A pipe 18 mounted as a by-pass serves to direct part of the precipitate into the remainder of the installation, only at predetermined intervals of time.

Accordingly, and since the transfer pump 14 is intended to operate in a continuous manner, the two valves 15 and 16 which are mounted in opposition make it possible:

(a) either to recycle the precipitate of plutonium oxalate in the settler 10 as a result of closure of the valve 16 and opening of the valve 15;

(b) or to pass the precipitate of plutonium oxalate from the settler 10 into the column 19 by effecting the closure of the valve 15 and the opening of the valve 16.

It is possible, for example, to introduce the precipitate of plutonium oxalate in the column 19 for a period of 4 to 5 seconds (operation b above) at three-minute intervals (operations a and b). The said column 19 is composed of three parts: the washing column proper 19a which consists of a glass tube having an internal diameter of 40 millimeters and an overall height of 500 millimeters; there is fitted in the interior of said glass tube a fixed tube of stainless steel 35 millimeters in diameter which is provided at its periphery with fins such as 20, said fins being inclined to the horizontal at an angle of 60°. The said fins generate turbulences within the washing liquid which circulates upwards within the annular space of approximately 2.5 millimeters in diameter.

The precipitate is introduced at the top of the column and falls under gravity into said annular space whilst the acid washing solution which is supplied from the tank 21 is fed by means of a pump 21' through the pipe 22 into the bottom of the column and progresses upwards within the same annular space. The said washing solution passes through a settling vessel 23 which is placed above the washing column proper and consists of a glass unit of cylindro-conical shape. The internal diameter of said settling vessel is 150 millimeters, the depth of the cylindrical portion thereof is 300 millimeters and its overall depth is approximately 400 millimeters; the angle at the vertex of the cone is 60° and the total volume is 5,900 cm.³. The said settling vessel makes it possible to prevent the entrainment of the precipitate.

The washing solution is collected by a peripheral trough 24 which is disposed at the top of the settling vessel 23 and is directed by the piping system 25 towards the recovery facility.

The precipitate which is washed in the column 19a is collected at the bottom of this latter in a small settler 26 of cylindro-conical shape and consisting of a glass unit having an internal diameter of 100 millimeters, a depth of cylinder of 150 millimeters and a total depth of 200 millimeters. The angle at the vertex of the cone is 60° and the total volume of the receiving vessel 26 is approximately 1,800 cm.³.

The precipitate which is present within the settling vessel 26 is collected by a transfer pump 27 which is similar to the pump 14. Valves 28 and 29 perform the same function as the valves 15 and 16 which have previously been described. The precipitate which is derived from the settling vessel 26 is thus directed through the piping system 30 into the column 31 for washing with water. Demineralized water which is supplied from a tank 33 by means of a pump 33' is introduced at the bottom of the column 31 through the piping system 32. The design of said column 31 is identical with that of column 19 and is provided with a top settling vessel 34 fitted with a peripheral cap 35 and evacuation pipe 36, and with a bottom settling vessel 37 from which purified plutonium oxalate is withdrawn by means of a transfer pump 38 of a design similar to those which have been previously described.

The extraction process takes place as previously stated by carrying out the recycling and one withdrawal during a limited period of time by means of the valves 39 and 40.

The evacuation pipe 41 serves to convey washed plutonium oxalate towards a drying plant.

The complete apparatus as has now been described is placed within a shielded enclosure consisting, for example, of a glove box, as shown in the figure in chain-dotted lines.

According to the method of the invention, all the stages—namely of precipitation, settling, transfer of the precipitate, acid washing, washing with water—are continuous, which permits the possibility of obtaining high flow rates although the volume of the apparatus is small and below critical conditions.

The practical application of the present invention makes it possible in addition to avoid the presence of any filtering plant and thus to prevent any possibility of clogging.

The design of the transfer device also permits the possibility of effective separation of the mother-liquors from the washing solutions.

By way of example, it can be stated that, in a test plant and starting from a solution of impure plutonium containing 560,000 p.p.m. of iron, washed plutonium oxalate was obtained with an iron content which did not exceed 160 p.p.m. This decontamination factor is so good that makes it possible to dispense with any preliminary purification of nitric acid solutions of plutonium by means of ion exchangers.

What we claim is:

1. Apparatus for the continuous precipitation of plutonium oxalate, successively consisting of a mixer which is supplied by means of a conduit for the admission of oxalic acid and by means of a conduit for the admission of plutonium nitrate, said mixer comprising a stirrer and an overflow outlet for the delivery of the precipitate of oxalate which is formed, a settler, a first acid washing column and a second column for washing with water, the settler and the two washing columns being coupled together by means of transfer devices, each transfer device comprising a recirculating conduit having a sludge pump and a branch conduit connected to the next successive device, an air valve in said recirculating conduit and an air valve in said branch conduit, and means for manipulating said air valves so that one is open while the other is closed whereby circulating precipitate can be transferred to the next device during selected time periods.

2. Apparatus in accordance with claim 1, wherein each washing column comprises a top settling device and a bottom settling vessel which are coupled to each other by means of a column provided with internal fins.

3. Apparatus for the continuous precipitation of plutonium oxalate, comprising successively: a mixer having a conduit for admission of oxalic acid, a conduit for admission of plutonium nitrate, a stirrer and an overflow outlet for the delivery of the precipitate of oxalate which is formed; a settler having means for receiving the precipitate of oxalate from said overflow outlet; a first acid washing column; and a second column for washing with water, the settler and the two washing columns each having a recirculating conduit containing a sludge pump and a by-pass conduit connected to said recirculating conduit, said recirculating conduit and said by-pass conduit having respective valves and means for operating said valves so that one is closed while the other is open, the by-pass conduit in the recirculating conduit for the settler being connected for delivery of oxalate precipitate into the first acid wash column and the by-pass conduit connected to the recirculating conduit of the first acid wash column being connected to deliver acid washed precipitate to the water wash column, whereby recirculation of oxalate precipitate to said settler and to said wash columns and periodic transfer of recirculating precipitate from one of the successive devices to the next can be accomplished by manipulation of said valves.

References Cited
UNITED STATES PATENTS

| | | | |
|---|---|---|---|
| 2,069,261 | 2/1937 | Monnet | 251—5 |
| 2,196,594 | 4/1940 | Muskat | 23—270.5 |
| 3,147,292 | 9/1964 | Clelland et al. | 260—429.1 |

JAMES H. TAYMAN, JR., *Primary Examiner.*